United States Patent
Osaki

[11] Patent Number: 6,147,694
[45] Date of Patent: Nov. 14, 2000

[54] SLOW MOTION REPLAY SYSTEM HAVING SIMPLE STRUCTURE

[75] Inventor: Bunri Osaki, Tokyo, Japan

[73] Assignee: NEC Corporation, Tokyo, Japan

[21] Appl. No.: 09/103,541

[22] Filed: Jun. 24, 1998

[30] Foreign Application Priority Data

Jun. 25, 1997 [JP] Japan ................................. 9-168763

[51] Int. Cl.$^7$ .................................................. G06F 15/00
[52] U.S. Cl. ............................................................. 345/473
[58] Field of Search .................................. 345/473, 474, 345/475, 328, 522, 523, 949

[56] References Cited

U.S. PATENT DOCUMENTS 5,692,117  11/1997  Berend et al. ........................ 345/475
5,999,195  12/1999  Santangeli ............................. 345/473

FOREIGN PATENT DOCUMENTS 7-170485   7/1995   Japan.
8-336131  12/1996   Japan.
9-107523   4/1997   Japan.

*Primary Examiner*—Phu K. Nguyen
*Attorney, Agent, or Firm*—Whitham, Curtis & Whitham

[57] ABSTRACT

A slow motion replay system comprises a data transmitting section which adds null data to picture data at every predetermined unit to make transmission data which has N (N≧2, N: integer) times length of the picture data. A decoding section receives the transmission data and picks out the picture data from the transmitting data to decode the picture data into decoded data. The decoding section supplies the decoded data to a display N times for every frame. The display displays each frame N times.

7 Claims, 4 Drawing Sheets

SLOW MOTION REPLAY SYSTEM HAVING SIMPLE STRUCTURE

BACKGROUND OF THE INVENTION

This invention relates to a slow motion replay system for replaying picture data stored in a video server, particularly relates to a slow motion replay system for replaying the picture data according to demand from a replay terminal which is distant from the video server.

A type of replay system has a video server and a replay terminal, which are connected to each other by a transmission line. The video server reads out picture data which has a frame from a memory medium according to demand from the replay terminal and supplies the read out data to the replay terminal through the transmission line. The replay terminal decodes the read out data into decoded data and displays the moving picture on a display in response to the decoded data.

Slow motion replay can be carried out by the replay system. Usually, the video server adds null data to the read out data to realize the slow motion replay. Such a slow motion replay system is disclosed in a Japanese Unexamined Patent Publication (JP-A) No. 7-170485.

The replay system has a fault that it has a complicated structure. This is because the replay system must judge whether the picture data are valid or not for every bit (or byte) at real time.

If the replay system forms slow motion replay data previously, it becomes simple in structure. However, the replay system needs a large memory for the slow motion replay data in this case.

In addition, the replay system has another fault that it must control a flow of the picture data between the video server and the replay terminal.

SUMMARY OF THE INVENTION

It is therefore an object of this invention to provide a slow motion replay system having simple structure.

It is another object of this invention to provide a slow motion replay system capable of reproducing a system clock signal in a replay terminal.

Other object of this invention will become clear as the description proceeds.

On describing the gist of this invention, it is possible to understand that a slow motion replay system is for replaying picture data to display a moving picture on a display.

According to the gist of this invention, the slow motion replay system comprises a data transmitting section which adds null data to the picture data at every predetermined unit to make transmission data which has N (N≧2, N: integer) times length of the picture data, and transmits the transmission data. A decoding section is connected to the data transmitting section and picks out the picture data from the transmitting data to decode the picture data into decoded data, and supplies the decoded data to the display N times for every frame.

According to another gist of this invention, a slow motion replay system is for reading out picture data from memory medium and for replaying the picture data to display a moving picture on a display. The slow motion replay system comprises a data transmitting section which reads out the picture data from the memory medium and adds null data to the picture data to produce transmission data and to lower effective data transfer rate into 1/N (N≧2, N: integer). A decoding section is connected to the data transmitting section and picks out the picture data from the transmitting data to decode the picture data into decoded data, and supplies the decoded data to the display N times for every frame.

DESCRIPTION OF THE PREFERRED EMBODIMENT

Figure 1:
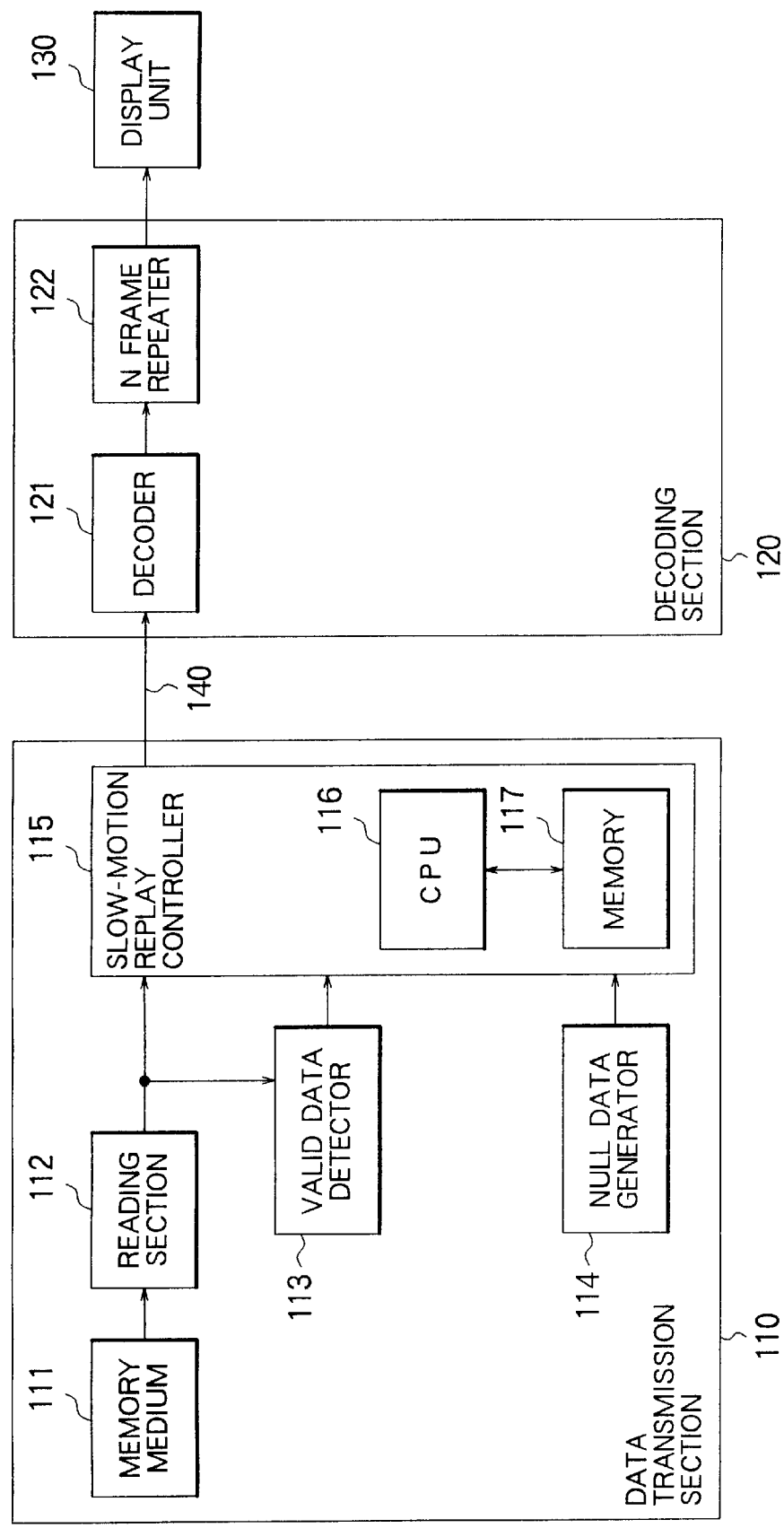
FIG. 1 is a block diagram of a conventional slow-motion replay system.

Referring to FIG. 1, description will be at first directed to a conventional slow motion replay system for a better understanding of this invention.

A conventional slow motion replay system comprises a data transmission section 110, a decoding section 120 and a display unit 130. The data transmission section 110 corresponds to a video server while a combination of the decoding section 120 and the display unit 130 corresponds to a replay terminal.

The data transmission section 110 has a memory medium 111 that memorizes picture data which has a frame. A reading section 112 is related to the memory medium 111 and reads out the picture data from the memory medium 111 to produce read out data. A valid data detector 113 is connected to the reading section 112 to detect valid data from the read out data. A null data generator 114 periodically generates null data. A slow motion replay controller 115 is connected to the reading section 112, the valid data detector 113 and the null data generator 114 to transmit the valid data together with the null data. The slow motion replay controller 115 includes a CPU 116 for controlling the slow motion replay controller 115 and a memory 117 for memorizing the valid data and the null data.

The decoding section 120 is connected to the data transmission section 110 through a transmission line 140 and has a decoder 121 that decodes transmission data transmitted by the data transmission section 110. An N frame repeater 122 is connected to the decoder 121 to repeat supplying the decoded data to the display unit 130 N (N≧2, N: integer) times for every frame of moving picture.

An operation of the slow motion replay system will be described soon.

The reading section 112 reads out the picture data from the memory medium 111 at 1/N times of the normal replay rate in response to demand from the decoding section 120. Then the reading section 112 supplies the read out data to both the valid data detector 113 and the slow motion replay controller 115.

The valid data detector 113 judges whether each bit of the read out data is valid or not and produces a result signal which is representative of valid bit when each bit is valid.

The null data generator 114 generates null data at a predetermined rate that is higher than (1-1/N) times of the normal replay rate.

The slow motion replay controller 115 picks out the valid bits from the read out data in response to the result signal and produces valid data. Then, the slow motion replay controller 115 adds the null data to the valid data so that the valid data is transmitted at 1/N times of the normal replay bit rate. In other words, the slow motion replay controller 115 transmits the combination of the valid data and the null data at the rate of normal replay so that the valid data is transmitted at 1/N times of the normal replay bit rate.

The decoder 121 receives the combination of the valid data and null data and decodes them to produce decoded data. In this time, the decoder 121 ignores the null data. The decoded data is supplied to the N frame repeater 122.

The N frame repeater 122 supplies the decoded data N times for every frame to the display unit 130.

The display unit 130 spends N times as long as the normal display for displaying each frame of the moving picture. As a result, each frame is displayed on the display unit 130 for N times as long as the normal replay.

As mentioned above, the valid data detector 113 judges whether the read out data are valid or not for every bit at real time. Accordingly, the valid data detector 113 must have high ability to process. If slow motion data for slow motion replay are prepared previously, the valid data detector 113 is unnecessary. However, the slow motion data are very large in size. Namely, when the slow motion data is for N times slow motion replay, its size is N times of that of the normal replay. As a result, a large memory is necessary for the slow motion data.

On the other hand, each of the data transmission section 110 and the decoding section 120 must synchronize with a system clock signal. If one of them does not synchronize the system clock signal, processing rate of them are different from each other. Accordingly, it is necessary to control data flow between them or to control the number of times the N frame repeater repeats so as to avoid over or under flow in a receiving buffer (not shown) of decoder 121.

Referring to FIGS. 2 through 5, the description will proceed to a slow motion replay system according to a preferred embodiment of this invention.

Figure 2:
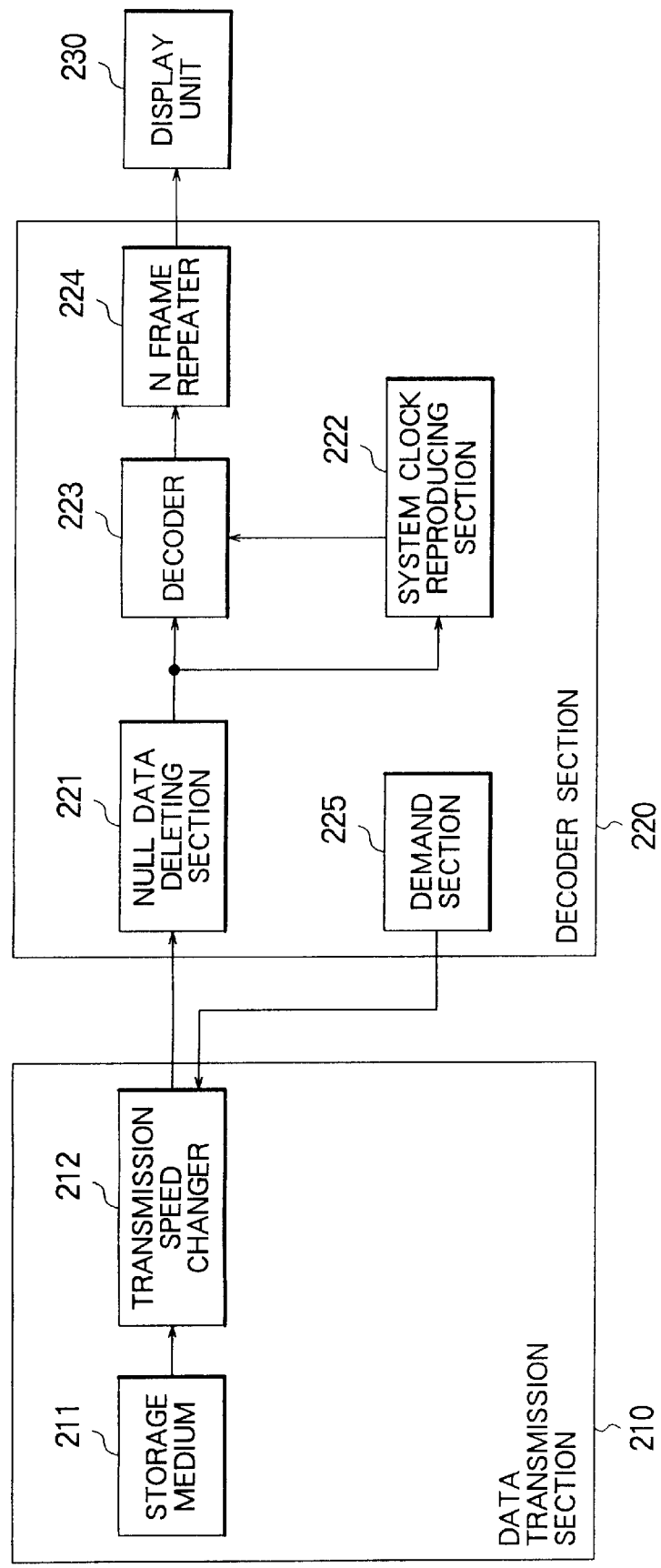
FIG. 2 is a block diagram of a slow motion replay system according to a preferred embodiment of this invention.

In FIG. 2, the slow motion replay system comprises a data transmission section 210, a decoder section 220 and a display unit 230.

The data transmission section 210 has a storage medium 211 which stores normal replay picture data. A transmission speed changer 212 is connected to the storage medium 211 to receive the normal replay picture data. The transmission speed changer 212 adds null data to the normal replay picture data to produce transmission data and to transmit them at a predetermined transmission speed.

The decoder section 220 is connected to the data transmission section 210 and receives the transmission data. The decoder section 220 has a null data deleting section 221 which deletes the null data from the transmission data to produce received data. A system clock reproducing section 222 is connected to the null data deleting section 221 to reproduce a system clock signal on the basis of the received data. A decoder 223 is connected to the null data deleting section 221 and the system clock reproducing section 222 and decodes the received data in response to the system clock signal to produce decoded data. An N frame repeater 224 is connected to the decoder 223 supplies the decoded signal N times for every frame to the display unit 230 which is connected to the decoder section 220. A demand section 225 demands transmission of the picture data to the data transmission section 210 and is usually included in the decoding section 120 illustrated in FIG. 1 also, although omission is made from FIG. 1.

An operation of the slow motion replay system will be made below.

The transmission speed changer 212 reads out the normal replay picture data at 1/N times of the normal replay rate in response to demand from the demand section 225. Then, the transmission speed changer 212 adds null data having a length of "N-1" (N≧2, N: integer) to every picture data having a length of "1" to produce the transmission data. The length of "1" is a fixed and is formed by, for example, dozens bits. The transmission data is transmitted to the decoder section 220 at 1/N speed of the normal replay.

The null data deleting section 221 deletes the null data from the transmission data and picks out the normal replay picture data as the received data. The system clock reproducing section 222 detects a time stamp information from the received data and reproduce the system clock signal on the basis of the time stamp information. The decoder 223 decodes the received data by the use of the system clock signal and produces a picture signal as the decoded data. The N frame repeater 224 supplies the picture signal N times for every frame to the display unit 230.

The display unit displays moving picture according to the picture signal. The display unit displays each frame of the moving picture for N times as long as the normal replay.

Figure 3:
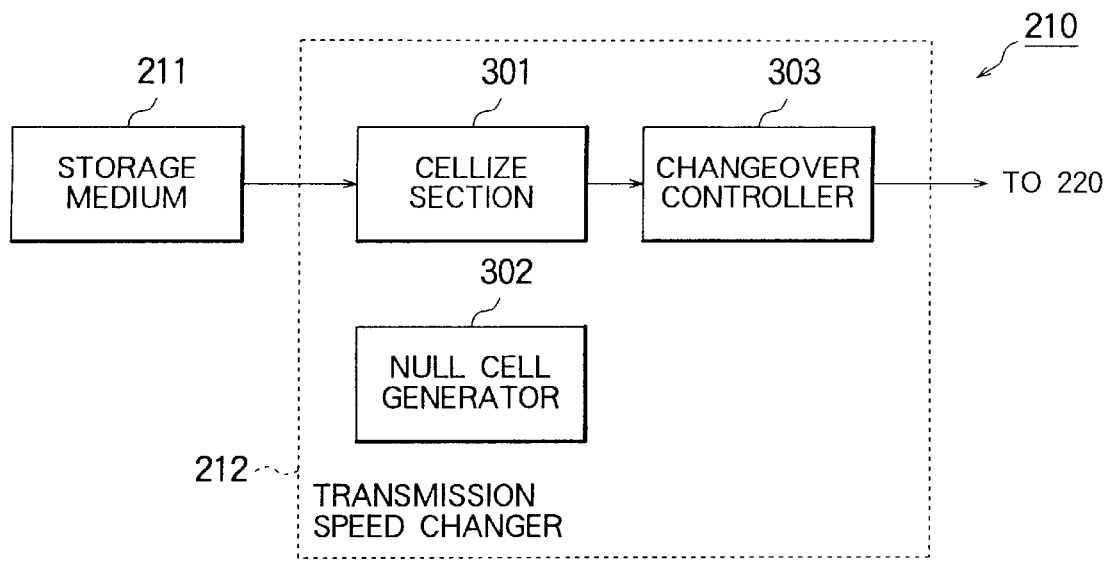
FIG. 3 is a block diagram of a transmission speed changer used in the slow motion replay system of FIG. 2.

When the data transmission section 210 and the decoder section 220 are connected to each other through a variable rate transfer network which is, for example, an asynchronous transfer mode network, the transmission speed changer 212 is formed as shown in FIG. 3.

In FIG. 3, the transmission speed changer 212 comprises a cellize section 301 which transfers the picture data into picture cells. A null cell generator 302 periodically generates null cells. A changeover controller 303 is connected to the cellize section 301 and the null cell generator 302 and outputs the picture cells and null cells.

An operation of the transmission speed changer 212 is described below.

The cellize section 301 reads out the normal replay picture data from the storage medium 211 and divides them into a plurality of pieces each of which has predetermined length. In addition, the cellize section 301 forms the picture cells from the pieces of picture data. The picture cells are supplied to the changeover controller 303.

The null cell generator 302 generates the null cell at a speed that is higher than N-1 times of supplying of picture cells.

The changeover controller 303 temporarily memorized the picture cells and the null cells and sends them to the decoding section 220 at the predetermined ratio of the picture cell to the null cell. The predetermined ration is 1 to N-1. As a result, the transmission rate of the picture data is 1/N of that of the normal replay.

If the null cell is unassigned cell or an idle cell, the null data deleting section 221 is unnecessary. This is because a transmission line interface section (not shown) is normally arranged in the decoder section 220 and it connects the decoder section 220 to the data transmission section 210 and deletes the null data.

Figure 4:
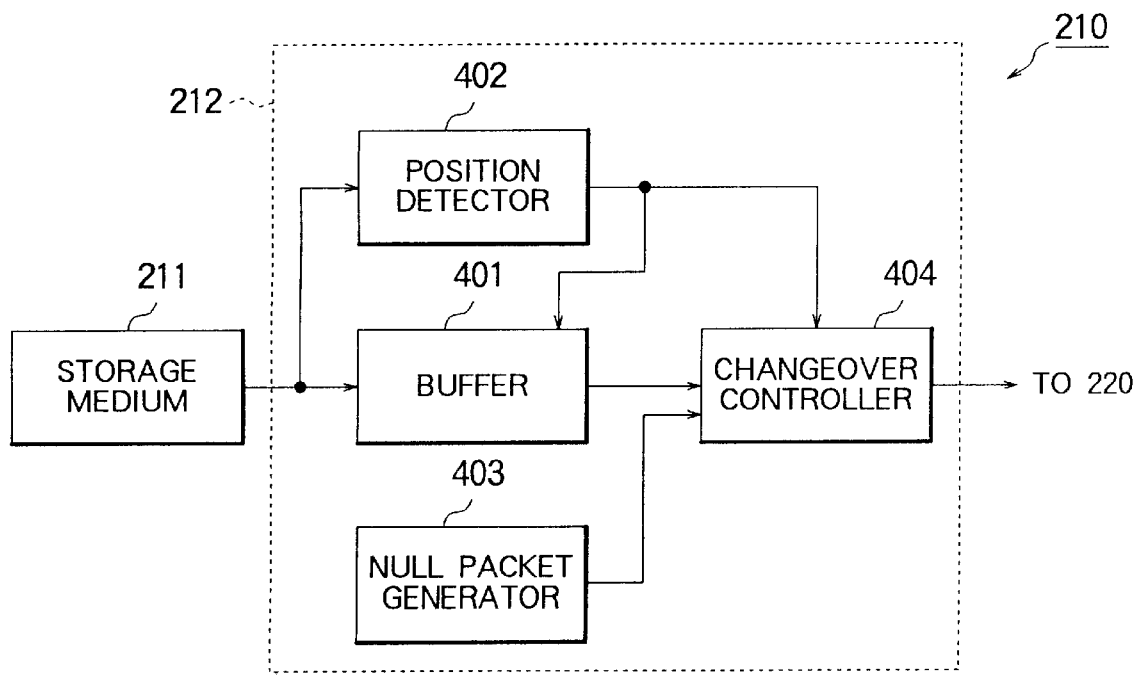
FIG. 4 is a block diagram of another transmission speed changer used in the slow motion replay system of FIG. 2.

When the data transmission section 210 and the decoder section 220 are connected to each other through a fixed rate transfer network, the transmission speed changer 212 is formed as shown in FIG. 4. In this case, the storage medium 211 memorizes picture packets each of which has a header and picture data having a predetermined length.

In FIG. 4, the transmission speed changer 212 comprises a buffer 401 which stores the picture packets. A position detector 402 is connected to the buffer and detects a position of the header of each picture packets. A null packed generator 403 generates null packets periodically. A changeover controller 404 is connected to the buffer 401, the position detector 402, and the null packet generator 403 transmits the picture packets and the null packets.

An operation of the transmission speed changer 212 is described soon.

The storage medium 211 provides the picture packets to both the buffer 401 and the position detector 402. The buffer 401 temporarily stores the picture packets. The position detector 402 detects the header of each picture packets and notifies the buffer 401 and changeover controller 404 of the detection.

The buffer 401 supplies the picture packets to the changeover controller 404 at a predetermined period. However, the buffer 401 stops supplying the picture packed for a predetermined time when the detection is notified by the position detector 402.

The changeover controller 403 outputs the picture packets when the buffer 401 supplies them. The changeover controller 403 outputs N−1 of the null packets when the detection is notified by the position detector 402. Namely, the changeover controller 403 outputs N−1 of the null packets per each picture packet. The predetermined time is equal to the time for outputting the N−1 of the null packets.

For example, the fixed packet has a data length of 188 byte in a transport stream of MPEG2 (Moving Picture encoding Group 2). The changeover controller 404 adds N−1 of the null packets to every picture packet and changes the transmission speed of the picture packets into 1/N times of the normal replay.

A transport stream processor (not shown) deletes the null packets. Accordingly, the null data deleting section 221 is unnecessary in this case.

Figure 5:
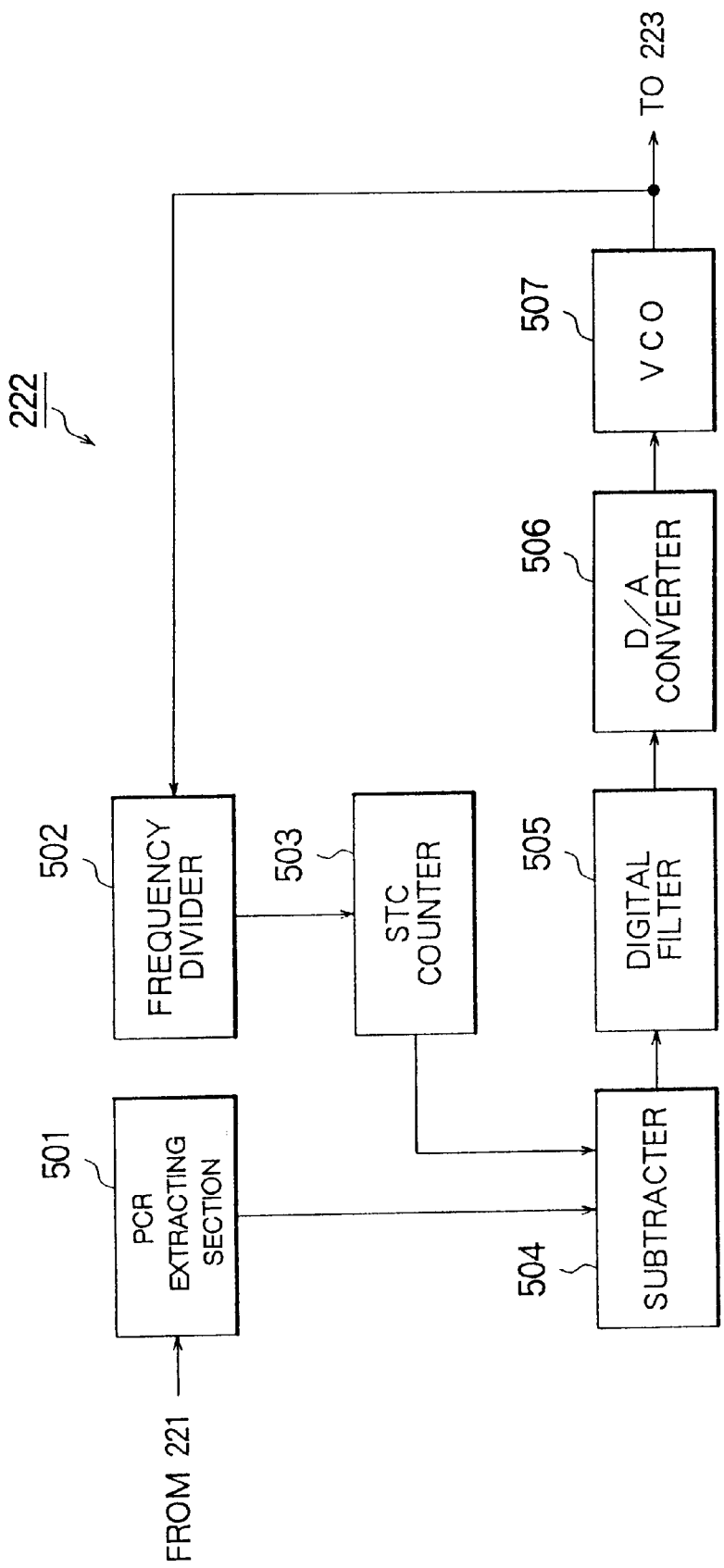
FIG. 5 is a block diagram of a system clock reproducing section used in the slow motion replay system of FIG. 2.

In FIG. 5, the system clock reproducing section 222 is shown in detail. The system clock reproducing section 222 comprises a PCR extracting section 501 which extracts a time stamp (i.e. PCR: Program Clock Reference) from received data. A frequency divider 502 divides a reproduced system clock signal by N to produce a system time clock (STC) signal. An STC counter 503 is connected to the frequency divider 502 and counts the pulse of the STC signal. A subtracter or comparator 504 is connected to the PCR extracting section 501 and the STC counter 503 and calculates a difference between the PCR and a counted value of the STC counter 503 to produce a difference signal. A digital filter 505 is connected to the subtracter 504 and removes out of band noise from the difference signal to produce a filtered difference signal. A D/A converter 506 is connected to the digital filter 505 and converts the filtered difference signal into a analog difference signal. A VCO (voltage controlled oscillator) 507 is connected to the D/A converter 506, the frequency divider 502, and the decoder 223 and produces the system clock signal in response to the analog difference signal to supply it to the frequency divider 502 and the decoder 223. The D/A converter 506 operates as a controller which controls the frequency of the system clock signal.

The decoder section 220 needs the system clock signal having a frequency for the normal replay, because the decoder 223 decodes the normal replay picture data which is used for the normal replay. The PCR has a predetermined value which is used for the normal replay. The decoder section 220 receives the PCR at long time period which is longer than that of the normal period. Then, the system clock reproducing section 222 has the frequency divider 502 to divide the system clock signal.

Because the system clock reproducing section 222 correctly reproduce the system clock signal, overflow and underflow of transmitted data is not caused in the decoder section 220. Accordingly the flow control between the data transmission section 210 and the decoder section 220 is unnecessary to avoid the overflow and the underflow. In addition, a larger buffer is unnecessary to storage the transmitted data transmitted at once of the flow control. Moreover, it is unnecessary to watch the receiving buffer (not shown) of the decoder section 220 and to control the number of times the display unit 230 displays for each frame.

What is claimed is:

1. A slow motion replay system for replaying picture data to display a moving picture on a display, said slow motion replay system comprising;

data transmitting means for adding null data to the picture data at every predetermined unit to make transmission data which has N (N≧2, N: integer) times length of the picture data, and for transmitting the transmission data, and decoding means connected to said data transmitting means for picking out the picture data from the transmitting data to decode the picture data into decoded data, and for supplying the decoded data to said display N times for every frame.

2. A slow motion replay system as claimed in claim 1, said decoding means comprising;

clock generator for producing system clock pulses which has a first frequency, frequency divider connected to said clock generator for dividing the system clock pulses to produce divided pulse which has 1/N of the first frequency, counter connected to said frequency divider for counting the divided pulse every predetermined time to produce a counted value, extracting section for extracting a time stamp form the picture data, comparator connected to said counter and said extracting section for compare the counted value with the time stamp to produce a comparison signal, and controller connected to said comparator and the clock generator for controlling said block generator in response to the comparison signal to change the first frequency.

3. A slow motion replay system as claimed in claim 1, said slow motion replay system further comprises a picture memory section for memorizing the picture data, wherein said data transmitting means read out the picture data from said picture memory section.

4. A slow motion replay system as claimed in claim 3, said decoding means has a demand means for demanding transmission of the picture data, wherein said transmitting means transmits the picture data in response to the demand from said demand means.

5. A slow motion replay system for reading out picture data from memory medium and for replaying the picture data to display a moving picture on a display, said slow motion replay system comprising;

data transmitting means for reading out the picture data from said memory medium and for adding null data to the picture data to produce transmission data and to lower effective data transfer rate into 1/N (N≧2, N: integer), and decoding means connected to said data transmitting means for picking out the picture data from the transmitting data to decode the picture data into decoded data, and for supplying the decoded data to said display N times for every frame.

6. A slow motion replay system as claimed in claim 5, said decoding means comprising;

extracting section for extracting a time stamp form the picture data, clock reproducer for reproducing a system clock signal which has a first frequency, frequency divider connected to said clock generator for dividing the system clock signal to produce a divided signal which has 1/N of the first frequency, counter connected to said frequency divider for for counting the divided signal every predetermined time to produce a counted value, comparator connected to said counter and said extracting section for compare the counted value with the time stamp to produce a comparison signal, and controller connected to said comparator and the clock generator for controlling said clock generator in response to the comparison signal to change the first frequency.

7. A slow motion replay system as claimed in claim 5, said data transmitting means included in a video server and said decoding means included in a moving picture replay terminal, wherein said moving picture replay terminal takes out the picture data from said data transmitting means.

* * * * *